United States Patent
Oh et al.

(10) Patent No.: US 7,251,480 B1
(45) Date of Patent: Jul. 31, 2007

(54) METHOD AND SYSTEM OF SENDING A VOICE MESSAGE IN A WIRELESS COMMUNICATION NETWORK

(75) Inventors: Dae-Sik Oh, Overland Park, KS (US); Deuk-Ho Ryu, Lenexa, KS (US); Leo Ray Anderson, Jr., Raymoore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 734 days.

(21) Appl. No.: 10/358,553

(22) Filed: Feb. 5, 2003

(51) Int. Cl.
*H04M 11/10* (2006.01)

(52) U.S. Cl. ............ 455/413; 455/445; 379/67.1; 379/88.25

(58) Field of Classification Search ........ 379/67.1, 379/88.25; 455/412.1, 413, 445
See application file for complete search history.

(56) References Cited

U.S. PATENT DOCUMENTS

| | | | |
|---|---|---|---|
| 5,608,779 A * | 3/1997 | Lev et al. ............ 455/436 |
| 5,793,810 A * | 8/1998 | Han et al. ............ 375/242 |
| 6,002,750 A * | 12/1999 | Ertz ............ 379/88.12 |
| 6,138,022 A * | 10/2000 | Strawczynski et al. ..... 455/445 |
| 6,172,974 B1 * | 1/2001 | Tseng et al. ............ 370/357 |
| 6,181,926 B1 * | 1/2001 | LaRocca ............ 455/413 |
| 6,185,424 B1 * | 2/2001 | Pon et al. ............ 455/445 |
| 6,272,358 B1 * | 8/2001 | Brent et al. ............ 455/560 |
| 7,089,011 B1 * | 8/2006 | Mangal ............ 455/445 |
| 2002/0054571 A1 * | 5/2002 | Falsafi ............ 370/252 |

* cited by examiner

*Primary Examiner*—Fan Tsang
*Assistant Examiner*—Hemant Patel

(57) ABSTRACT

A method and system for sending a voice message in a wireless communication network. A mobile station may encode an audio speech signal into a voice mail message and send the voice mail message through a wireless network to a voice mail server. An entity of the wireless network may first receive the message and determine if an intended recipient is another mobile station. If so, the entity may simply forward to voice mail message on to the voice mail server. If not, the entity may transcode the voice mail message into another format and then send the formatted voice mail message to the voice mail server, which stores the voice mail message for later delivery to the intended recipient.

21 Claims, 5 Drawing Sheets

METHOD AND SYSTEM OF SENDING A VOICE MESSAGE IN A WIRELESS COMMUNICATION NETWORK

FIELD OF INVENTION

The present invention relates to communications networks and, more particularly, to sending a voice mail message within a wireless communication network.

BACKGROUND

In a typical wireless communication network, a subscriber may be authorized to use many different types of services. For instance, a subscriber may subscribe to a call forwarding or a text messaging service. Each of these services may provide specific features to a subscriber that may depend on the type of wireless device that the subscriber uses. For example, a user of a wireless cellular telephone may receive a text message as a short abbreviated sentence. And the same text message may be presented to a user of a wireless computing device as a full complete sentence.

Similar to text messaging, a subscriber may also subscribe to a voice mail message service. A voice mail message service allows a caller to leave a voice message for a callee. The voice message is typically referred to as a "voice mail message," since the voice message may be conceptually delivered to the callee similar to mail. The caller may record a voice message, which may then be stored within an entity of the wireless communication network, such as a voice mail server. And the callee may then access the voice message remotely by connecting to the voice mail server and listening to the voice message.

Unfortunately, however, when the caller sends the voice mail message to the server, and also when the callee retrieves the message from the server, the voice mail message is encoded several times to accommodate a desired format for transmission. These various encodings of the voice mail message while transferring the voice mail message from the caller to the voice mail server and from the voice mail server to a receiving mobile station introduce distortion into the speech signal of the voice mail message.

SUMMARY

The present invention provides a mechanism to send voice mail messages within a wireless communication network.

In an exemplary embodiment, a method for sending a voice signal within a wireless network is provided. The method includes receiving a voice signal en route from a first mobile station to a network server to be stored by the network server for later delivery to a recipient terminal. The method further includes making a determination of whether the recipient terminal is a second mobile station. If the determination is that the recipient terminal is not a second mobile station, then the voice signal is transcoded before sending the voice signal to the network server. Alternatively, if the determination is that the recipient terminal is a second mobile station, then the voice signal is sent to the network server without transcoding the voice signal.

In another respect, the exemplary embodiment may take the form of a system in communication with a first mobile station and a network server. The system comprises a transcoder that may receive a voice mail message sent from the first mobile station and transcode the voice mail message from a first format into a second format. The system also comprises a bypass mechanism that makes a determination as to whether an intended recipient of the voice mail message is a second mobile station. If the determination is that the intended recipient of the voice mail message is a second mobile station, the bypass mechanism responsively bypasses transcoding by the transcoder to cause the voice mail message to be sent to the network server in the first format. Alternatively, if the determination is that the intended recipient of the voice mail message is not a second mobile station, the bypass mechanism responsively allows the transcoding by the transcoder to cause the voice mail message to be sent to the network server in the second format.

In still another respect, the exemplary embodiment may take the form of a system that comprises a first mobile station and an entity. The first mobile station may receive an analog voice message and encode the analog voice message into a first format to form a first signal. The first mobile station may send the first signal to a network server, which stores the first signal. The entity may receive the first signal from the first mobile station and make a determination as to whether an intended recipient of the first signal is a second mobile station. If the determination is that the intended recipient of the first signal is a second mobile station, the entity sends the first signal to the network server in the first format. If the determination is that the intended recipient of the first signal is not a second mobile station, the entity responsively transcodes the first signal into a second format to form a second signal and sends the second signal to the network server.

In yet another respect, the exemplary embodiment may take the form of a method of communicating a voice mail message from a first terminal to a second terminal. The method includes receiving the voice mail message in a first format being sent from the first terminal through a wireless network to a voice mail server, and making a determination of whether the second terminal is a mobile station. If the determination is that the second terminal is not a mobile station, then the voice mail message is transcoded into a second format before sending the voice mail message to the voice mail server. If the determination is that the second terminal is a mobile station, then the voice mail message is sent to the voice mail server in the first format. The method further includes storing the voice mail message at the voice mail server and notifying the second terminal of the voice mail message stored at the voice mail server. The method also includes the second terminal requesting the voice mail message from the voice mail server, and if the second terminal is a mobile station, the voice mail server sending the voice mail message through the wireless network to the second terminal in the first format.

These as well as other features and advantages will become apparent to those of ordinary skill in the art by reading the following detailed description, with appropriate reference to the accompanying drawings.

BRIEF DESCRIPTION OF FIGURES

Reference is made to the attached figures, wherein like reference numerals refer to like elements in the various figures, and wherein.

DETAILED DESCRIPTION OF EXEMPLARY EMBODIMENTS

In accordance with an exemplary embodiment, a method and system for sending a voice mail message within a wireless communication network is provided. A mobile station may send a voice mail message in a first format through a wireless network to a voice mail server. As the message is en route from the mobile station to the voice mail server, an entity of the wireless network may determine if the intended recipient of the voice mail message is another mobile station. If so, the entity will simply forward the voice mail message on to the voice mail server. If not, the entity will transcode the voice mail message into a second format, and then send the re-formatted voice mail message to the voice mail server.

A. Wireless Communication Network

Figure 1:
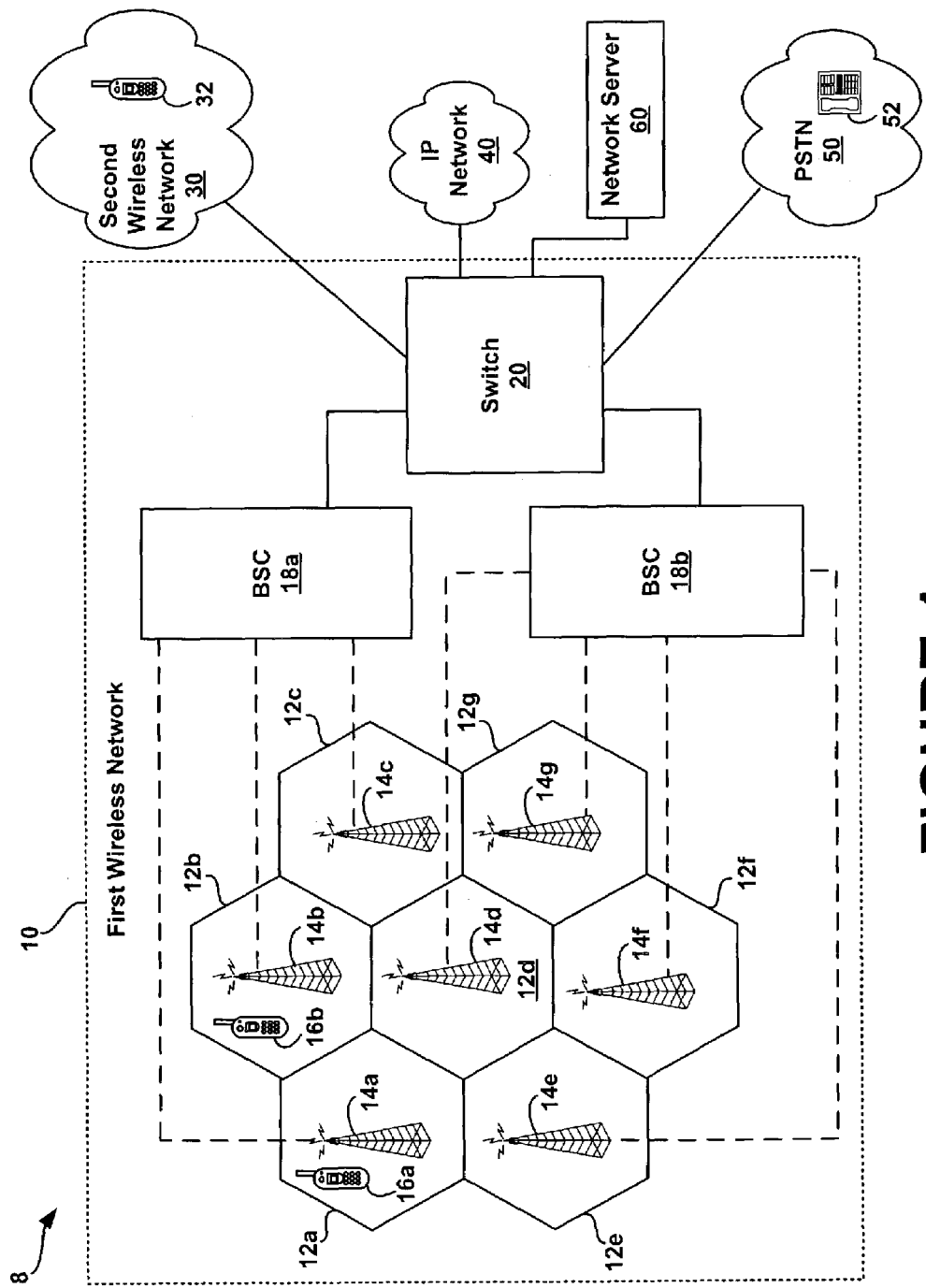
FIG. 1 is a block diagram illustrating one embodiment of a wireless communication network.

Referring now to the figures, FIG. 1 is a block diagram illustrating one embodiment of a wireless communication network 8. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

By way of example, the wireless communication network 8 includes a first wireless network 10 in communication with a second wireless network 30, an Internet protocol ("IP") network 40, a Public Switched Telephone Network ("PSTN") 50, and a network server 60.

The first wireless network 10 is divided geographically into a number of cell sites 12a–g (or simply "cells"), which are defined by the coverage areas of respective base transceiver stations ("BTSs") 14a–g. FIG. 1 illustrates the cells 12a–g as hexagons and each is configured such that none overlap. However, any of cells 12a–g may overlap a neighboring cell, and the size and shape of each cell may vary due to location of the cell (e.g., urban vs. rural area) or other network design factors. Furthermore, the first wireless network 10 may alternatively be divided into more or fewer cells, or possibly be arranged in an entirely different manner as well.

Each coverage area of BTSs 14a–g is defined respectively by a radio frequency ("RF") radiation pattern from BTS antennas. The radiation pattern produces an air interface that provides a communication path between a mobile station ("MS") and the BTS. For example, when an MS is positioned within a cell, the air interface provides a communication path between the MS and the wireless network. FIG. 1 illustrates MSs 16a–b present within cells 12a–b in communication with BTSs 14a–b. MSs 16a–b can communicate through this path with entities on the network 8, such as IP network 40. MSs such as cellular telephones, personal digital assistants ("PDA"), wireless modems, or other mobile nodes may be used in the wireless communication system 100. Moreover, generally any device with wireless connection capabilities may function as an MS.

Wireless signaling within the first and second wireless networks 10 and 30 may operate according to any wireless network protocol, such as global system for mobile communications ("GSM"), time division multiple access ("TDMA"), or code division multiple access ("CDMA"), for example. The specific protocol, which these networks operate, depends upon how voice or data signals are transferred between the MSs and BTSs, as well as the utilization of transmission frequencies, considering available bandwidth and the network's capacity constraints.

BTSs 14a–g each communicate with a base station controller ("BSC"). For example, BTSs 14a–c communicate with BSC 18a and BTSs 14d–g communicate with BSC 18b. BSCs 18a–b may be responsible for controlling power levels and frequency allocation for the air interface between the BTSs and MSs, and also for managing handoff of call traffic as an MS moves between cells 12a–g within the first wireless network 10.

BSCs 18a–b are in communication with a switch 20. Switch 20 may be located at a central office of a telephone company. The switch 20 may be, for example, a mobile switching center ("MSC") or another BSC, which enables communication to other network components (e.g., MSCs, other BSCs, and/or circuit switches). The switch 20 also enables communication with second wireless network 30 (and entities operating in second wireless network 30, such as MS 32), IP network 40, PSTN 50 (and entities operating in PSTN 50, such as telephone 52), and network server 60.

Each of the couplings within the first wireless network 10 and to components in communication with the first wireless network 10 may be an interface such as a trunk level 1 (T1) line, an Ethernet line, or other connections (whether wired or wireless).

Second wireless network 30 may be similar to first wireless network 10, and may include any number of mobile devices, such as MS 32. MS 32 may be similar to MSs 16a–b and may enable wireless communication with another endpoint.

IP network 40 may be any type of network that sends and receives IP data packets, such as the Internet. IP network 40 may also provide connectivity to other data packet switching networks as well.

PSTN 50 may be a standard landline telephone network that includes any number of service control points ("SCPs"), signal switching points ("SSPs"), signal transfer points ("STPs"), central offices, and non-mobile stations, such as telephone 52.

Network server 60 may be any type of server that stores (either temporarily or permanently) data for MSs, landline devices, or other network entities. Therefore, network server 60 may comprise any storage entity, such as a database. Furthermore, network server 60 may reside within first wireless network 10 as well.

In an exemplary embodiment, network server 60 is a voice mail server that receives, stores, and forwards voice mail messages for communication devices. In this manner, network server 60 may be a data storage device (e.g., a voice mail server) that can store voice mail messages for multiple MSs, such that network server 60 stores respective voice mail messages for respective MSs. Network server 60 may also couple to additional wireless networks, or other data networks, so that network server 60 may be accessible from any network (whether directly or remotely).

In operation, a user of MS 16a may wish to contact a user of MS 16b. MS 16a may connect to first wireless network 10 in order to communicate with MS 16b. If MS 16a does not establish a connection to MS 16b for any number of reasons, such as MS 16b possibly being out of range of coverage areas of first wireless network 10, being busy, or not answering, then first wireless network 10 may redirect the call to network server 60 so that the user of MS 16a may leave a voice mail message for the user of MS 16b on network server 60.

First wireless network 10 may connect the user of MS 16a to network server 60 after a predetermined time period during which the user of MS 16a does not establish a connection with the user of MS 16b. The user of MS 16a may then record a voice message on network server 60 or possibly forward a pre-recorded voice message to network server 60, which may store the voice message for a future delivery to the user of MS 16b.

In this manner, the user of MS 16a may leave voice messages for the user of MS 16b stored at network server 60. The user of MS 16b may then access these voice messages by accessing network server 60 through first wireless network 10, or possibly through a landline network, such as the PSTN.

B. Vocoding

In first wireless network 10, MS 16a–b may prepare a voice message for transmission over an air interface by digitizing and encoding an analog voice signal (i.e., compress a speech signal into a new format according to an appropriate algorithm) received from a user. MS 16a–b may include an Enhanced Variable Rate Codec ("EVRC") that forms an analog voice signal into an 8 or 13 Kilobyte digital signal, for example. MS 16a–b may form the audio voice signal according to one of any speech codec systems available. As another example, the audio voice signal may be encoded into a 16 Kbyte data signal that comprises 13 Kbyte speech code and 3 Kbyte additional signaling.

BSC 18a–b may receive the encoded voice signal and decode (i.e., reconstruct the voice signal from a compressed format according to an appropriate algorithm) the voice signal. BSC 18a–b may also include an EVRC in order to decode the encoded signal received from MS 16a–b into a digital representation of the voice signal, such as a Pulse Code Modulation ("PCM") A-law signal that has a bandwidth of 64 Kbytes, to send the voice signal to switch 20 for transmission to another endpoint.

Similarly, BSC 18a–b can receive a digital representation of a voice signal destined for MS 16a–b. BSC 18a–b would then encode the digital representation for transmission over the air interface to MS 16a–b. MS 16a–b may then decode the encoded voice, convert the underlying digital representation to an analog signal, and output the analog signal to a user.

When a voice call is placed between MSs 16a–b, or any two MSs operating on first wireless network 10 or on separate wireless networks, this system is inherently inefficient, because the system will unnecessarily perform back-to-back decoding and encoding of data. Namely, a sending mobile station would encode a voice signal for transmission to an originating BSC. The originating BSC then decodes the voice signal sent from the mobile station, and sends the decoded signal through the radio access network to a receiving BSC, which could be the same as the original BSC. The receiving BSC would then encode the voice signal and transmit it to a receiving mobile station, which would then decode the voice signal. This back-to-back "vocoding" (voice decoding and/or encoding) can degrade signal quality and delay voice transmission.

Vocoding may also be referred to as transcoding, or a process for modifying a stream of data so that it may be carried via a different type of network. One example of transcoding is a conversion of H.320 video encoding, carried via circuit switched systems, to H.323 so that it can connect with and be transmitted across packet switched systems.

"Tandem free operation" ("TFO") or "vocoder bypass" can be used to overcome vocoding inefficiency. According to this mechanism, if a voice call is a mobile-to-mobile call (i.e., between two MSs, whether fixed wireless devices or actually mobile wireless devices), then data may be passed transparently through first wireless network 10 between the MSs without back-to-back vocoding. The vocoding may be essentially "turned off" for a voice call between two MSs. On the other hand, if the voice call is between an MS and a non-mobile station (e.g., a landline telephone), then the data may be vocoded for transmission to PSTN 50 serving the non-mobile station, e.g., telephone 52.

By not having to convert a voice signal from a digital encoded voice signal to a digital encoded transmission signal and then back again to the digital voice signal, quantization distortion may be avoided and enhanced audio quality can be achieved.

C. Transmitting Voice Mail Messages

Figure 2:
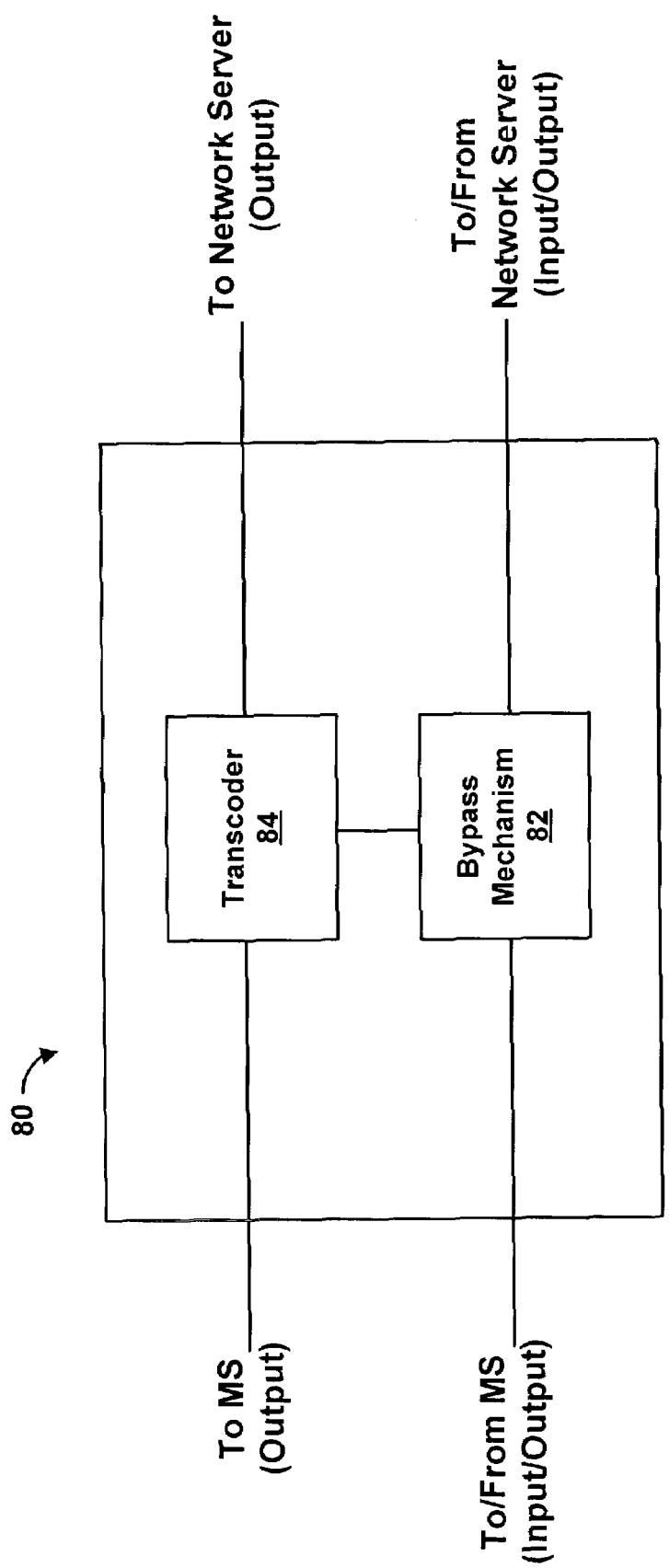
FIG. 2 illustrates one embodiment of an entity of the wireless communication network that employs the vocoder bypass technique.

In one embodiment, the present invention provides a mechanism to send voice mail messages within a wireless communications network using the vocoder bypass technique. FIG. 2 illustrates an entity 80 of first wireless network 10 that employs the vocoder bypass technique. In an exemplary embodiment, a user of MS 16a may send a voice mail message to entity 80 of first wireless network 10. Alternatively, MS 16a may send the voice mail message to some entity, which could in turn (directly or indirectly) send the voice mail message to entity 80. Entity 80 may be BSC 18a–b or switch 20, or a component of either BSC 18a–b or switch 20. Entity 80 may also be a separate intermediate entity in communication with either BSC 18a–b or switch 20, such as a transcoder unit ("TRAU") for example. Furthermore, entity 80 may be a component of network server 60 or an entity in communication with network server 60 as well.

Entity 80 will receive signals from mobile stations, such as MS 16a, at a bypass mechanism 82. Bypass mechanism 82 may receive voice mail messages from MS 16a, or bypass mechanism 82 may simply receive signals from MS 16a that indicate an intended recipient of a voice mail message to be sent.

Bypass mechanism 82 may then make a determination of whether an intended recipient of the voice mail message is an MS (whether a fixed wireless device or a wireless mobile device). If the determination is that the recipient is not an MS, then bypass mechanism 82 may send the voice mail message to a transcoder 84, which transcodes the voice mail message before sending it to network server 60 to be stored for later delivery to the recipient. However, if the determination is that the recipient is an MS, then bypass mechanism 82 sends the voice mail message to network server 60 without transcoding the message, but rather sends the voice mail message to network server 60 in the form in which MS 16a sent the voice mail message to entity 80.

Entity 80 receives messages from mobile stations or from network server 82 at bypass mechanism 82. First, bypass mechanism 82 decides whether transcoder 84 should transcode the message. If bypass mechanism 82 determines that transcoder 84 should transcode the message, bypass mechanism 82 sends the message to transcoder 84.

Transcoder 84 may not receive messages from mobile stations or from network server 60. Alternatively, transcoder 84 may receive messages from mobile stations or from network server 60, and bypass mechanism 82 can then instruct transcoder 84 whether or not to transcode the messages. Transcoder 84 may then send the messages to an MS or to network server 60 (or possibly to a landline telephone or other intended recipient devices).

Bypass mechanism 82 may be a processing unit operable to execute instructions, such as machine language instructions, to determine whether or not an intended recipient of a voice mail message is a mobile terminal using any one of the techniques described below. Bypass mechanism 82 may include, for example, any number of different components, such as computer-readable software programs, physical switches such as transistors designed for breaking data flow to transcoder 84, circuit breakers, and so forth. Bypass mechanism 82 may also be implemented in software.

Transcoder 84 may also be a processing unit operable to execute instructions, such as machine language instructions, to transcode or format a voice mail message into a desired format for delivery to an MS or to network server 60. For delivery to an MS, transcoder 84 may format the voice mail message into an 8 Kbyte message, and for delivery to network server 60, transcoder may format the voice mail message into a 64 Kbyte message, for example.

Figure 3:
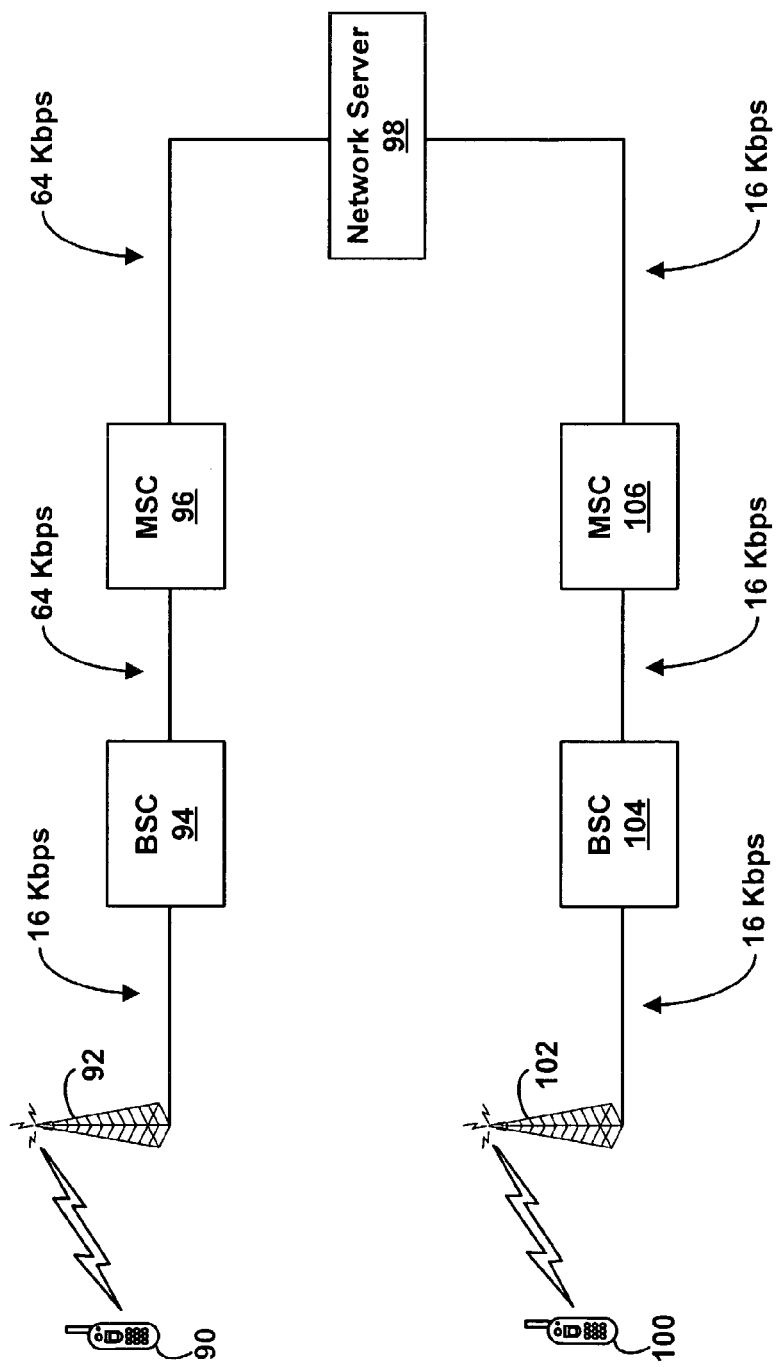
FIG. 3 illustrates two examples of transferring voice mail messages.

FIG. 3 illustrates two examples of transferring voice mail messages. As one example, a user of an MS 90 may speak a voice memo into MS 90, which then (or as the user speaks) encodes the voice memo into a voice mail message, such as a 16 Kbps message. MS 90 may then (or as the user speaks) send the voice mail message via a BTS 92 through a BSC 94 and an MSC 96 to a network server 98. However, before MSC 96 sends the message to network server 98, either BSC 94 or MSC 96 (in this example, BSC 94) first will determine who is the intended recipient of the message, and/or what type of device is the intended recipient in order to decide whether to transcode the message or not.

BSC 94 may determine whether or not to transcode the message by reading and interpreting a portion of the message. For example, the message may have a prefix that indicates the intended recipient's device type. BSC 94 may have a database that correlates prefixes to device types. If the prefix is "55," then that may indicate the intended recipient is an MS. The prefix may be any length and may contain any characters (whether numeric or alpha characters).

As another example, BSC 94 may determine whether or not to transcode the message according to the "Method and System For Vocoder Bypass Using Differentiated Telephone Numbers," as described in commonly owned U.S. patent application Ser. No. 10/193,532, filed on Jul. 11, 2002, the contents of which are fully incorporated herein by reference. As still another example, BSC 94 may determine whether to transcode the message or not according to the "Method and System For Vocoder Bypass Using Electronic Serial Numbers," as described in commonly owned U.S. patent application Ser. No. 10/193,054, filed on Jul. 11, 2002, the contents of which are fully incorporated herein by reference.

Still other methods of determining whether to transcode the message or not are possible. BSC 94 may use any identifier within the message to make the determination, such as electronic serial numbers ("ESN"), mobile identification numbers ("MIN"), originating or terminating telephone numbers, or others. Furthermore, specific BSCs or switches within the wireless network may be programmed to solely transcode messages or not transcode messages.

If BSC 94 determines that the intended recipient is not an MS, then BSC 94 may transcode the voice mail message from a first format, such as the 16 Kbps digital signal into a second format, such as a 64 Kbps signal, and then send the formatted voice mail message through MSC 96 to network server 98 to be stored for later delivery to the recipient. BSC 94 may transcode the voice mail message from any first format into any second corresponding format. As other examples, BSC 94 may convert a CDMA voice mail message into a PCM signal, or a GSM voice mail message into a PCM signal.

In the second example illustrated in FIG. 3, BSC 104 determines that the recipient of a voice mail message sent from an MS 100 is another MS. A BTS 102 receives the voice mail message, and sends the voice mail message as the 16 Kbps signal to BSC 104. BSC 104 determines that the recipient is an MS and simply sends the voice mail message to an MSC 106 in the format in which BSC 104 received the message, i.e., in the 16 Kbps format. MSC 106 then sends the voice mail message in the 16 Kbps format to network server 98, which stores the 16 Kbps formatted voice mail message.

The 16 Kbps voice mail message is passed transparently from MS 100 to network server 98 (and subsequently to the intended recipient). In the standard eight bit PCM signal frame (which operates at 64 Kbps), this 16 Kb voice mail message could pass in just two of the PCM bits, rather than being converted to a 64 Kb signal.

As still another example, if the recipient is an MS, the voice mail message may be sent as IP-over-EVRC data through a BSC and a switch to a network server. The network server may then store the EVRC representation of the voice message and, upon request by the intended recipient device, the network server can then send the voice mail message as IP-over-EVRC data to the recipient device. The recipient device will then receive the EVRC representation of the voice message and decode the EVRC message in order to play out the voice message to the recipient. No additional formatting of the voice mail message is necessary, since the message was stored in a format desired by the intended recipient.

Figure 4:
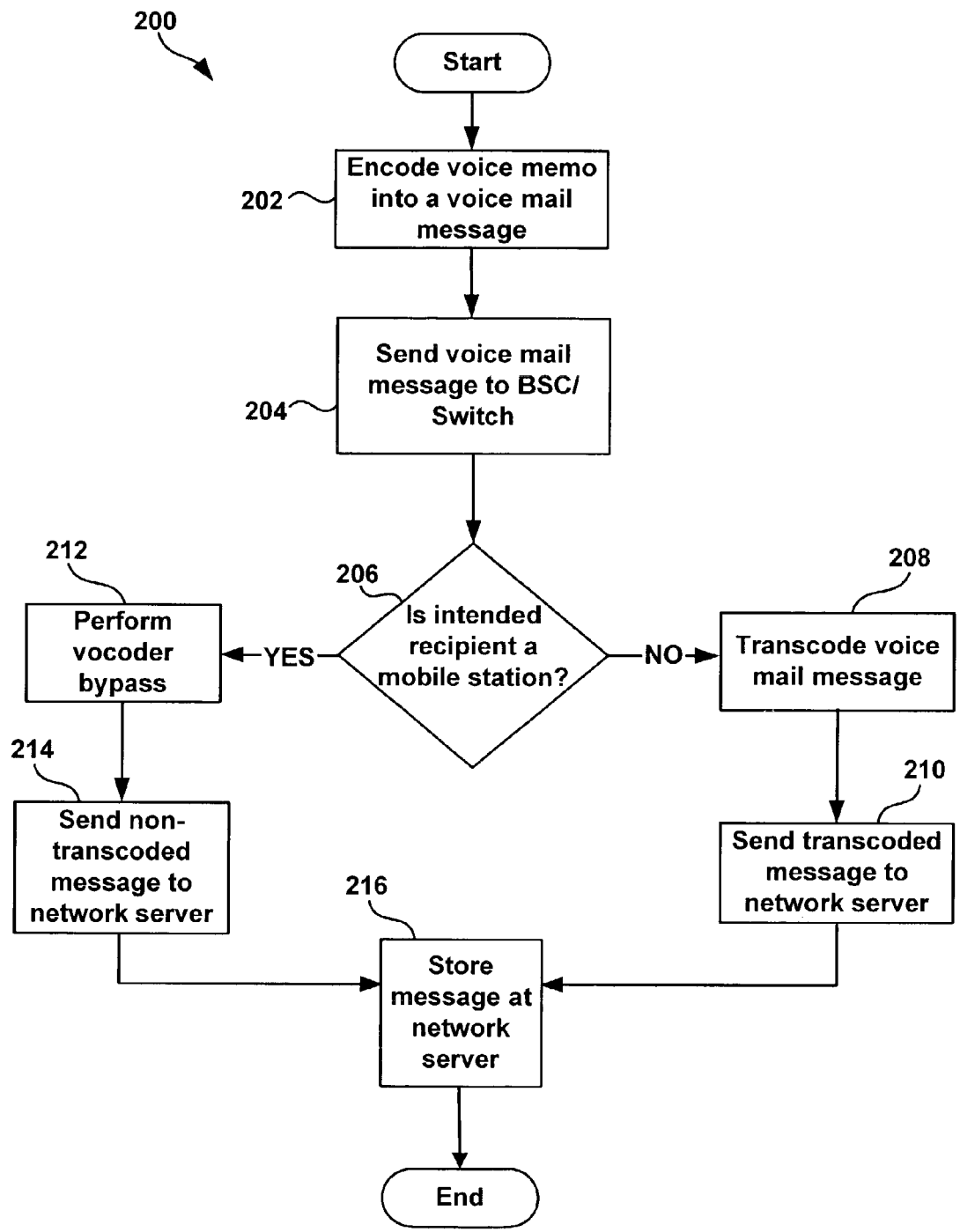
FIG. 4 is a flowchart depicting one embodiment of a method of transferring voice mail messages.

FIG. 4 is a flowchart depicting a method 200 of transferring voice mail messages. Initially, an MS will receive a voice memo from a user and encode the voice memo into a voice mail message, as shown at block 202. The MS will then send the voice mail message to a BSC/switch, as shown at block 204. The BSC/switch will determine if the intended recipient is an MS, as shown at block 206. If the intended recipient is not an MS, then the BSC/switch will transcode the voice mail message into another format for transmission to a network server, as shown at blocks 208 and 210.

If the intended recipient is an MS, then the BSC/switch will perform vocoder bypass, by not transcoding the voice mail message, and send the non-transcoded voice mail message to the network server as shown at blocks 212 and 214. The network server will either receive the non-transcoded or transcoded voice mail message and store the received message for later delivery to the intended recipient, as shown at block 216.

D. Retrieving Voice Mail Messages

In one embodiment, the intended recipient may receive a voice mail alert message whenever a caller leaves a voice mail message for the user on network server 60, as illustrated in FIG. 1. For instance, after MS 16a leaves a voice message for MS 16b, network server 60 may generate and send a voice mail alert message, in a short message service ("SMS") format, to MS 16b through the first wireless network 10. In response to receiving the voice mail alert message, MS 16b may then connect to network server 60 through the first wireless network 10 in order to request the voice mail message.

Figure 5:
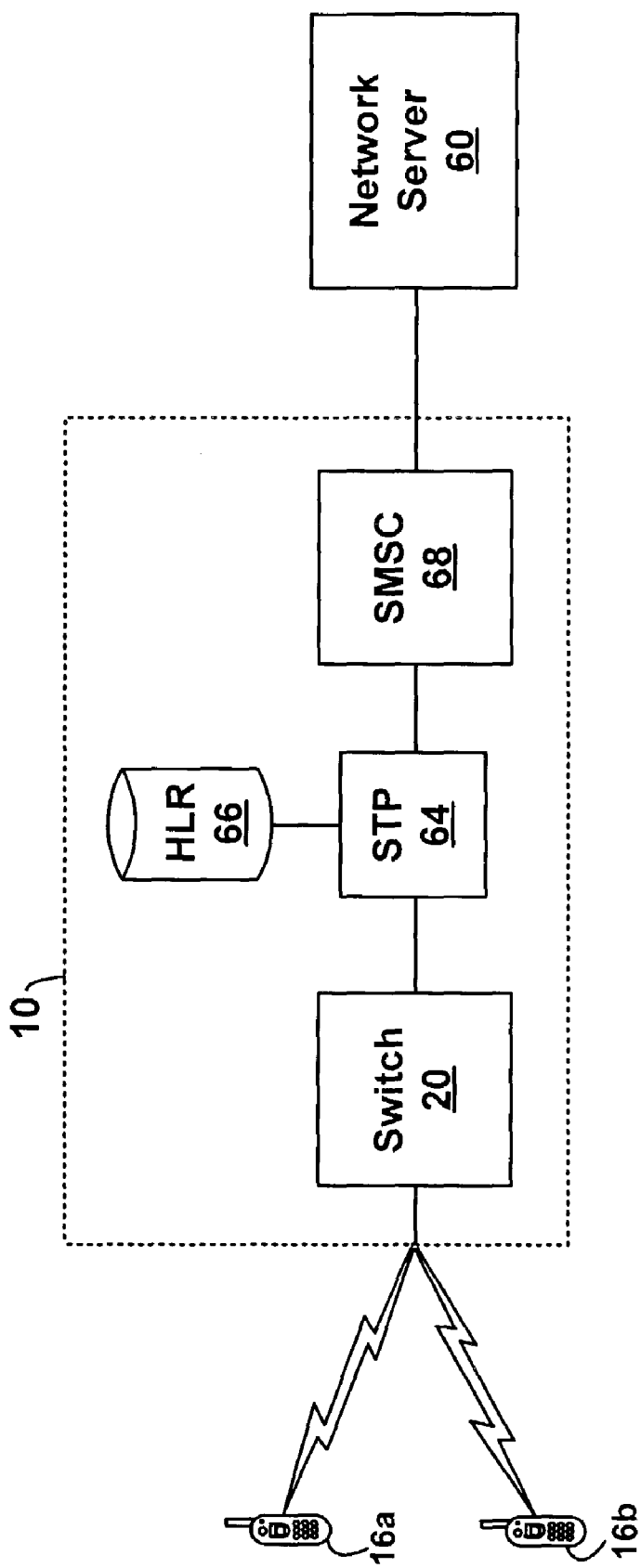
FIG. 5 is a block diagram illustrating a portion of the wireless communication network.

FIG. 5 is a block diagram illustrating a portion of the wireless communication network 8 operable to send voice mail alert messages to an MS. The first wireless network 10 is shown to include an STP 64 coupled switch 20. A home location register ("HLR") 66 and a short message service center ("SMSC") 68 are in communication with STP 64. SMSC 68 is also in communication with network server 60.

STP 64 is a network element that allows interconnections defined by Interim Standard 41 (IS-41), as published by the Telecommunication Industry Association and herein incorporated by reference, over signaling system 7 ("SS7") links with network elements, such as network server 60.

HLR 66 is a database used for permanent storage and management of subscriptions and service profiles for users of MSs of the wireless communication network 8. Although only one HLR is illustrated in FIG. 5, more than one may be present in the first wireless network 10. Each MS is associated with an HLR, and this HLR is considered to be the "home" register for the MS. Upon interrogation by SMSC 68, HLR 66 may provide routing information for an indicated MS.

SMSC 68 is a network entity that may be responsible for relaying short text messages from network server 60 to MS 16a–b. SMSC 68 may function as a store-and-forward system for messages. First wireless network 10 provides the mechanisms required to find a destination MS, such that SMSC 68 may then transport text messages to the destination MS. However, if the MS is inaccessible at any time during which SMSC 68 is attempting to deliver a message, SMSC 68 may then store the message until a later time when the MS becomes accessible.

Several mechanisms are available to send messages to MS 16a–b through SMSC 68. For example, paging networks, specialized software for personnel computer based messaging, and operator bureaus can initiate a text message. In addition, certain MSs may send messages to each other through SMSC 68. Furthermore, network server 60 may send a message through SMSC 68 to MS 16a–b as well.

First wireless network 10 may also include a visitor location register ("VLR") (not shown), which is a database that contains temporary information about users. The temporary information is accessible by switch 20, in addition to information from HLR 66, to service users. First wireless network 10 may further include an SMS-gateway (not shown) that functions as an MSC that is capable of receiving short text messages from SMSC 68, interrogating HLR 66 or other database on first wireless network 10 for routing information, and delivering the short text messages to switch 20 for delivery to an MS.

In response to receiving a voice mail alert message, MS 16b may then connect to network server 60 through the first wireless network 10 in order to request the voice mail message from network server 60. Network server 60 will then send the voice mail message to switch 20, which sends the message to BSC 18b, and either BSC 18b or switch 20 will determine if MS 16b is an MS. Furthermore, network server 60 may make the determination of whether MS 16b is a mobile station before sending the voice mail message to switch 20. Once it is determined that MS 16b is an MS, BSC 18b and switch 20 will forward the voice mail message to MS 16b in the format in which it was stored within network server 60. Therefore, no transcoding occurs. MS 16b may then receive and listen to the voice mail message.

As another example, network server 60 may operate solely to store voice mail messages for MSs. In this instance, when MS 16b requests a voice message that has been stored in network server 60, the voice message will simply be forwarded to MS 16b. Since network server 60 operates to store messages only for MSs, it is not necessary to determine whether or not to transcode the voice message before sending the voice message to MS 16b. All voice messages stored in network server 60 may simply be sent to an intended recipient upon request without transcoding the messages.

While the invention has been described in conjunction with presently preferred embodiments of the invention, persons of skill in the art will appreciate that variations may be made without departure from the scope and spirit of the invention. This true scope and spirit is defined by the appended claims, which may be interpreted in light of the foregoing.

What is claimed is:

1. A method for sending a voice signal within a wireless communications network, the method comprising:
  receiving a voice signal being sent from a first mobile station to a network server to be stored by the network server for later delivery to a recipient terminal;
  making a determination of whether the recipient terminal is a second mobile station;
  if the determination is that the recipient terminal is not a second mobile station, then transcoding the voice signal before sending the voice signal to the network server; and
  if the determination is that the recipient terminal is a second mobile station, then sending the voice signal to the network server without transcoding the voice signal.

2. The method of claim 1, wherein making the determination comprises making the determination upon receipt of the voice signal.

3. The method of claim 1, further comprising storing the voice signal in the network server.

4. The method of claim 1, wherein making the determination comprises reading at least a portion of the voice signal to recognize a recipient terminal identifier and making the determination based at least in part on the recipient identifier.

5. The method of claim 1, wherein transcoding the voice signal comprises converting the voice signal from a first format into a second format.

6. The method of claim 1, further comprising notifying the recipient terminal of the voice signal stored in the network server.

7. The method of claim 6, further comprising, upon request by the recipient terminal, sending the voice signal from the network server to the recipient terminal.

8. The method of claim 7, further comprising:
  if the recipient terminal is not a second mobile station, then transcoding the voice signal during transmission of the voice signal from the network server to the recipient terminal; and
  if the recipient terminal is a second mobile station, then sending the voice signal from the network server to the recipient terminal without transcoding the voice signal.

9. The method of claim 1, wherein the voice signal is a voice mail message and the network server is a voice mail server.

10. A system in communication with a first mobile station and a network server, the system comprising:
- a transcoder operable to receive a voice mail message sent from the first mobile station and to transcode the voice mail message from a first format into a second format; and
- a bypass mechanism that makes a determination as to whether an intended recipient of the voice mail message is a second mobile station and (i) if the determination is that the intended recipient of the voice mail message is a second mobile station, the bypass mechanism responsively bypasses transcoding by the transcoder so as to cause the voice mail message to be sent to the network server in the first format and (ii) if the determination is that the intended recipient of the voice mail message is not a second mobile station, the bypass mechanism responsively allows the transcoding by the transcoder so as to cause the voice mail message to be sent to the network server in the second format.

11. The system of claim 10, further comprising an intermediate entity which enables communication between the first mobile station and the network server, wherein the intermediate entity includes the transcoder and the bypass mechanism.

12. The system of claim 11, wherein the intermediate entity is selected from the group consisting of a base station controller and a mobile switching center.

13. The system of claim 10, wherein the transcoder is a processing unit operable to execute instructions to transcode the voice mail message from the first format into the second format.

14. The system of claim 10, wherein the bypass mechanism is a processing unit operable to execute instructions to make the determination as to whether the intended recipient of the voice mail message is a second mobile station.

15. A system comprising:
- a first mobile station operable to receive an analog voice message and form the analog voice message into a first format to form a first signal, and the first mobile station being operable to send the first signal to a network server which stores the first signal; and
- an entity operable to receive the first signal from the first mobile station and make a determination as to whether an intended recipient of the first signal is a second mobile station and (i) if the determination is that the intended recipient of the first signal is a second mobile station, the entity responsively sends the first signal to the network server in the first format, and (ii) if the determination is that the intended recipient of the first signal is not a second mobile station, the entity responsively transcodes the first signal into a second format to form a second signal and sends the second signal to the network server.

16. The system of claim 15, wherein the network server notifies the intended recipient of the first signal stored in the network server.

17. The system of claim 16, wherein the network server stores the analog voice message and, upon request by the intended recipient, sends the analog voice message through the entity to the intended recipient, wherein the entity sends the analog voice message in the first format if the intended recipient is the second mobile station.

18. The system of claim 16, wherein the first mobile station includes an enhanced variable rate codec which is operable to form the analog voice message into the first format to form the first signal.

19. The system of claim 15, wherein the entity is selected from the group consisting of a base station controller, a mobile switching center, a component of a base station controller, a component of a mobile switching center, an intermediate entity in communication with a base station controller, and an intermediate entity in communication with a mobile switching center.

20. A method of communicating a voice mail message from a first terminal to a second terminal, the method comprising:
- receiving the voice mail message in a first format being sent from the first terminal through a wireless network to a voice mail server;
- making a determination of whether the second terminal is a mobile station;
- if the determination is that the second terminal is not a mobile station, then transcoding the voice mail message into a second format before sending the voice mail message to the voice mail server;
- storing the voice mail message at the voice mail server in the second format suitable for transmission to the second terminal that is not a mobile station;
- if the determination is that the second terminal is a mobile station, then sending the voice mail message to the voice mail server in the first format;
- storing the voice mail message at the voice mail server in the first format suitable for transmission to the second terminal that is a mobile station;
- notifying the second terminal of the voice mail message stored at the voice mail server;
- the second terminal requesting the voice mail message from the voice mail server; and
- if the second terminal is a mobile station, the voice mail server sending the voice mail message through the wireless network to the second terminal in the first format.

21. The method of claim 20, wherein if the second terminal is not a mobile station, the voice mail server sending the voice mail message to the second terminal in the second format.

* * * * *